United States Patent
Pese et al.

(10) Patent No.: US 11,625,031 B2
(45) Date of Patent: Apr. 11, 2023

(54) ANOMALY DETECTION SYSTEMS AND METHODS

(71) Applicant: GM GLOBAL TECHNOLOGY OPERATIONS LLC, Detroit, MI (US)

(72) Inventors: Mert Dieter Pese, Howell, MI (US); Prachi Joshi, Sterling Heights, MI (US); Kemal E. Tepe, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 257 days.

(21) Appl. No.: 17/107,274

(22) Filed: Nov. 30, 2020

(65) Prior Publication Data
US 2022/0172010 A1    Jun. 2, 2022

(51) Int. Cl.
| | |
|---|---|
| *G05B 23/02* | (2006.01) |
| *B60L 3/00* | (2019.01) |
| *G06F 17/18* | (2006.01) |
| *G06N 20/00* | (2019.01) |
| *G06F 18/25* | (2023.01) |

(52) U.S. Cl.
CPC .......... *G05B 23/024* (2013.01); *B60L 3/0092* (2013.01); *G05B 23/0281* (2013.01); *G06F 18/25* (2023.01); *G06F 17/18* (2013.01); *G06N 20/00* (2019.01)

(58) Field of Classification Search
CPC ... G05B 23/024; G05B 23/0281; G06F 17/18; G06N 20/00
See application file for complete search history.

(56) References Cited

U.S. PATENT DOCUMENTS

| | | | | |
|---|---|---|---|---|
| 5,548,597 A | * | 8/1996 | Kayama | G05B 23/024 714/736 |
| 6,223,107 B1 | * | 4/2001 | Mergenthaler | G01D 3/08 701/41 |
| 2022/0108569 A1 | * | 4/2022 | Kim | B60W 50/0205 |

FOREIGN PATENT DOCUMENTS

JP    2009281263 A    * 12/2009

OTHER PUBLICATIONS

Deckert et al., "F-8 DFBW Sensor Failure Identification Using Analytic Redundancy" IEEE Transactions on Automatic Control, vol. AC-22, No. 5, Oct. 1977 (Year: 1977).*
Wang et al., "Detecting Vehicle Anomaly by Sensor Consistency: An Edge Computing Based Mechanism" 2018 IEEE (Year: 2018).*
Ganesan et al., "Exploiting Consistency Among Heterogeneous Sensors for Vehicle Anomaly Detection" SAE Technical Paper 2017-01-1654, 2017 (Year: 2017).*
Khalastchi et al., "Online Anomaly Detection in Unmanned Vehicles" Proc. of 10th Int. Conf. on Autonomous Agents and Multiagent Systems (AAMAS 2011), Turner, Yolum, Sonenberg and Stone (eds.), May 2-6, 2011, Taipei, Taiwan, pp. 115-122 (Year: 2011).*

* cited by examiner

*Primary Examiner* — John C Kuan
(74) *Attorney, Agent, or Firm* — Lorenz & Kopf LLP (57) ABSTRACT

Systems and method are provided for detecting an anomaly of a sensor of a vehicle. In one embodiment, a method includes: storing a plurality of sensor correlation groups based on vehicle dynamics; processing a subset of signals based on the sensor correlation groups to determine when an anomaly exists; processing the subset of signals based on the sensor correlation group to determine which sensor of the sensor correlation group is anomalous; and generating notification data based on the sensor of the correlation group that is anomalous.

16 Claims, 5 Drawing Sheets

ANOMALY DETECTION SYSTEMS AND METHODS

The present disclosure generally relates to vehicles, and more particularly relates to systems and methods for detecting anomalies within a vehicle.

An autonomous or semi-autonomous vehicle is a vehicle that is capable of sensing its environment and navigating with little or no user input. An autonomous vehicle senses its environment using sensing devices such as inertial measurement units, radar, LIDAR, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

In addition, the autonomous or semi-autonomous vehicles rely on sensor data from sensors that monitor observable conditions of the vehicle such as, but not limited to, speed sensors, position sensors, yaw rate sensors, inertial sensors, etc. In some instances, one or more of the sensors can become faulty. Faults in a sensor and/or faults or malicious attacks of the corresponding sensor data can cause the controlling software to perceive the environment and/or the vehicle functions incorrectly and thus, lead the system to make poor decisions. Accordingly, it is desirable to provide improved methods and systems for detecting anomalies of sensors of the vehicle. It is further desirable to provide methods and systems for detecting anomalies of sensors of other vehicles. Furthermore, other desirable features and characteristics of the present invention will become apparent from the subsequent detailed description and the appended claims, taken in conjunction with the accompanying drawings and the foregoing technical field and background.

SUMMARY

Systems and method are provided for detecting an anomaly of a sensor of a vehicle. In one embodiment, a method includes: storing a plurality of sensor correlation groups based on vehicle dynamics; processing a subset of signals based on the sensor correlation groups to determine when an anomaly exists; processing the subset of signals based on the sensor correlation group to determine which sensor of the sensor correlation group is anomalous; and generating notification data based on the sensor of the correlation group that is anomalous.

In various embodiments, the plurality of sensor correlation groups includes a position group, a speed group, an acceleration group, a heading group, and a yaw rate group. In various embodiments, each of the plurality of sensor correlation groups includes one or more sensors correlated to the group based on vehicle dynamics. In various embodiments, the subset of signals includes a position signal, a speed signal, an acceleration signal, a heading signal, and a yaw rate signal.

In various embodiments, the processing the subset of signals to determine when the anomaly exists includes computing a mean absolute error (MAE) based on the plurality of correlation groups.

In various embodiments, the processing the subset of signals to determine when the anomaly exists is based on a defined batch size.

In various embodiments, the processing the subset of signals to determine which sensor of the sensor correlation group is anomalous is based on a depth first search method and the plurality of sensor correlation groups.

In various embodiments, the processing the subset of signals to determine which sensor of the sensor correlation group is anomalous is based on a computed mean of a predicted condition vector associated with a sensor correlation group of the plurality of correlation groups.

In various embodiments, the method includes training a plurality of thresholds based on anomalous signal data, and wherein the processing the subset of signals to determine which sensor of the sensor correlation group is anomalous is based on the plurality of trained thresholds.

In various embodiments, the method includes training a plurality of thresholds based on anomalous signal data, and wherein the processing the subset of signals to determine when a sensor of the sensor correlation group is anomalous is based on the plurality of trained thresholds.

In another embodiment, a computer implemented system is provided. The computer implemented system includes an anomaly detection module that includes one or more processors configured by programming instructions encoded in non-transitory computer readable media, the anomaly detection module configured to: store a plurality of sensor correlation groups based on vehicle dynamics; process a subset of signals based on the sensor correlation groups to determine when an anomaly exists; process the subset of signals based on the sensor correlation group to determine which sensor of the sensor correlation group is anomalous; and generate notification data based on the sensor of the correlation group that is anomalous.

In various embodiments, the plurality of sensor correlation groups includes a position group, a speed group, an acceleration group, a heading group, and a yaw rate group. In various embodiments, each of the plurality of sensor correlation groups includes one or more sensors correlated to the group based on vehicle dynamics.

In various embodiments, the subset of signals includes a position signal, a speed signal, an acceleration signal, a heading signal, and a yaw rate signal.

In various embodiments, the anomaly detection module is configured to process the subset of signals to determine when the anomaly exists by computing a mean absolute error (MAE) based on the plurality of correlation groups.

In various embodiments, the anomaly detection module is configured to process the subset of signals to determine when the anomaly exists based on a defined batch size.

In various embodiments, the anomaly detection module is configured to process the subset of signals to determine which sensor of the sensor correlation group is anomalous based on a depth first search method and the plurality of sensor correlation groups.

In various embodiments, the anomaly detection module is configured to process the subset of signals to determine which sensor of the sensor correlation group is anomalous based on a computed mean of a predicted condition vector associated with a sensor correlation group of the plurality of correlation groups.

In various embodiments, wherein the anomaly detection module is configured to train a plurality of thresholds based on anomalous signal data, and process the subset of signals to determine which sensor of the sensor correlation group is anomalous based on the plurality of trained thresholds.

In various embodiments, the anomaly detection module is configured to train a plurality of thresholds based on anomalous signal data, and process the subset of signals to determine when a sensor of the sensor correlation group is anomalous based on the plurality of trained thresholds.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation; application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
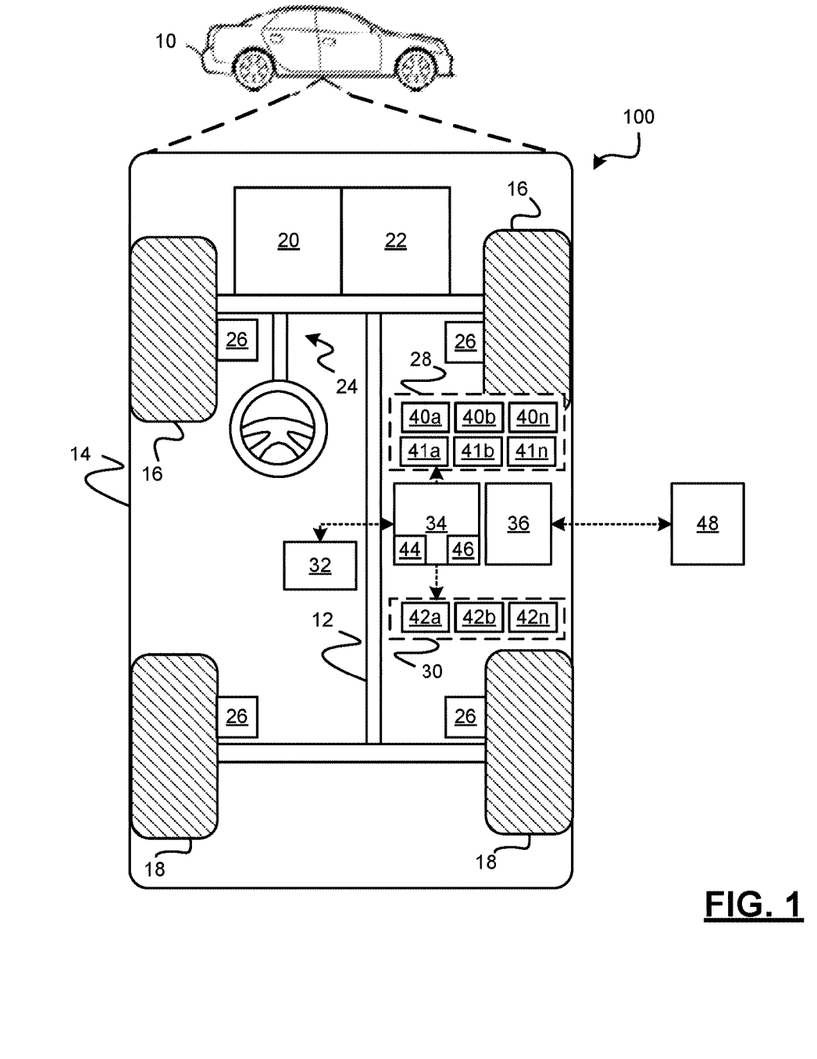
FIG. 1 is a functional block diagram illustrating a vehicle having an anomaly detection system, in accordance with various embodiments.

With reference to FIG. 1, an anomaly detection system shown generally at 100 is associated with a vehicle 10 in accordance with various embodiments. In general, the anomaly detection system 100 receives and processes signal data in order to detect data-centric anomalies in real-time in both the vehicle 10 (the ego vehicle) and other vehicles (communicating with the ego vehicle) using a subset of signals from Vehicle to Everything (V2X) messages such as, but not limited to, basic emergency and safety messages as will be discussed in more detail below. In various embodiments, the anomaly detection system 100 traces the origin of a detected anomaly to a specific signal or set of signals. In various embodiments, the anomaly detection system 100 verifies the correctness of its own signal data as well as protects the vehicle 10 from anomalous/misbehaving data from other vehicles.

As depicted in the example of FIG. 1, the vehicle 10 is an automobile and generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20, in various embodiments, includes an internal combustion engine, an electric machine, such as a traction motor powered by one or more batteries, alone (e.g., as a pure electric vehicle) or in combination with an internal combustion engine, and/or a fuel cell propulsion system (e.g., as a hybrid electric vehicle).

The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensor system 28 further includes one or more sensing devices 41a-41n that sense observable conditions of one or more vehicle components.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
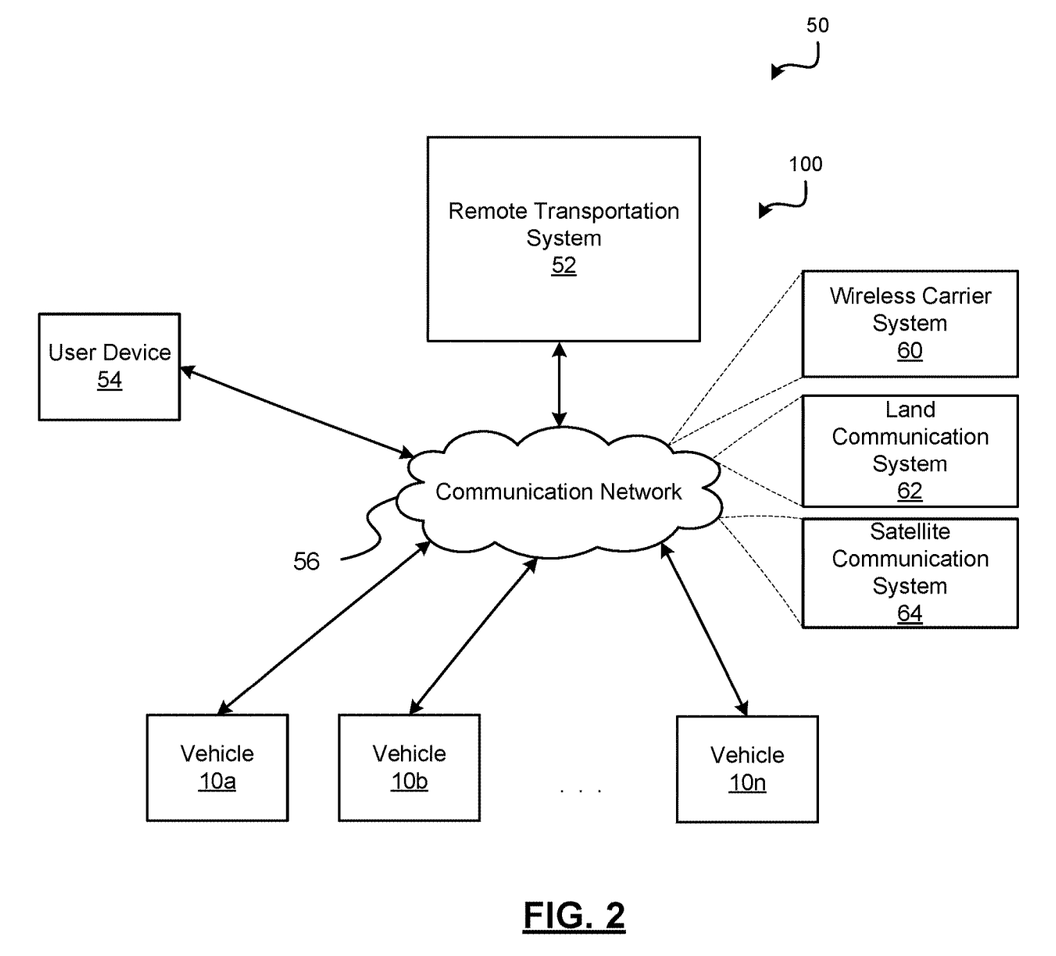
FIG. 2 is functional block diagram illustrating an operating environment of vehicles having the anomaly detection system, in accordance with various embodiments.

The communication system 36 is configured to wirelessly communicate information to and from other entities 48, such as but not limited to, other vehicles ("V2V" communication) infrastructure ("V2I" communication), everything ("V2X" communication), remote systems, charging stations, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel or cellular V2X (C-V2X), are also considered within the scope of the present disclosure. DSRC channels refer to one-way or two-way short-range to medium-range wireless communication channels specifically designed for automotive use and a corresponding set of protocols and standards.

The data storage device 32 stores data for use in controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10. In various embodiments, the controller 34 is configured to implement anomaly detection systems and methods as discussed in detail below.

The instructions of the controller 34 may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to control features of the vehicle 10. As mentioned briefly above, all or part of the anomaly detection system 100 of FIG. 1 is included within the controller 34.

With reference now to FIG. 2, where an operating environment of the anomaly detection system 100 is shown generally at 50 that includes a remote transportation system 52 that is associated with and communicates with one or more vehicles 10a-10n as described with regard to FIG. 1. In various embodiments, the operating environment 50 further includes one or more user devices 54 that communicate with the vehicles 10a-10n and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and/or the vehicles 10a-10n to schedule rides, dispatch vehicles 10a-10n, communicate information, and the like as will be discussed in more detail below.

As can be appreciated, the subject matter disclosed herein provides certain enhanced features and functionality to what may be considered as a standard or baseline vehicle 10 and/or remote transportation system 52. To this end, a vehicle and a remote transportation system can be modified, enhanced, or otherwise supplemented to provide the additional features of the anomaly detection system 100 disclosed herein.

Figure 3:
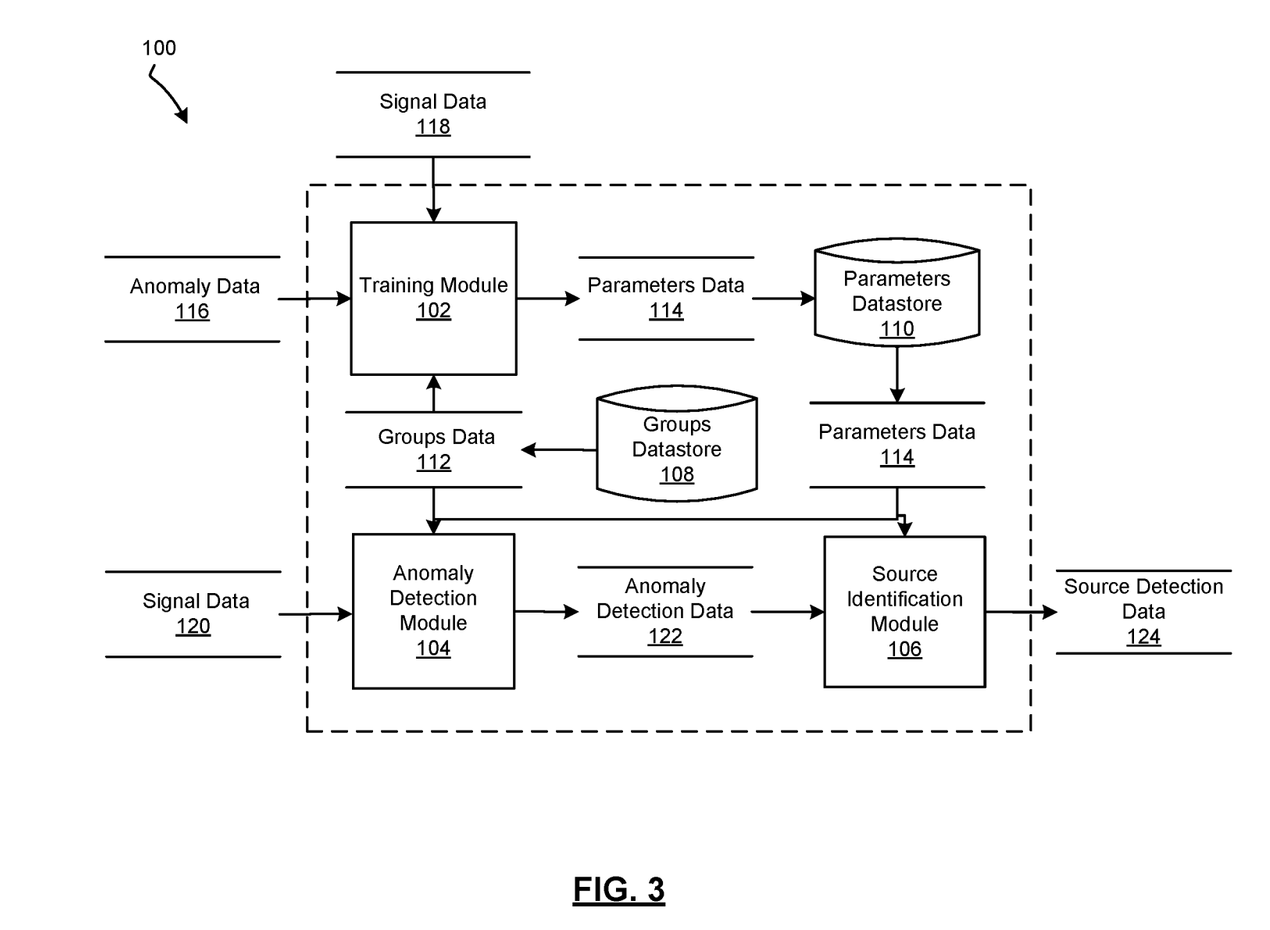
FIG. 3 is a dataflow diagram illustrating an anomaly detection module, in accordance with various embodiments.

As shown in more detail with regard to FIG. 3 and with continued reference to FIG. 1, the anomaly detection system 100 may be implemented as one or more modules configured to perform one or more methods by way of, for example, a processor. As can be appreciated, the modules shown in FIG. 3 can be combined and/or further partitioned in order to perform the functions or methods described herein. Furthermore, inputs to the modules may be received from the sensor system 28, received from other control modules (not shown) associated with the vehicle 10, received from the communication system 36, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the anomaly detection system 100 includes a training module 102, an anomaly detection module 104, a source identification module 106, a groups datastore 108, and a parameters datastore 110.

In various embodiments, the groups datastore 108 stores groups data 112 relating to sensor pairs. For example, vehicle dynamics can be expressed with fundamental physics equations where sensor pairs are inherently cross-correlated. Correlation groups are created based on these physics' equations. For example, given the following relationships:

$$p_{t+dt} = f(p_t, v_t, h_t) = p_t + \int_t^{t+dt} v_t h_t dr \qquad (1)$$

$$v_t = f(p_t, p_{t+dt}) = \frac{p_{t+dt} - p_t}{dt} \qquad (2)$$

$$a_t = f(v_t, v_{t+dt}) = \frac{v_{t+dt} - v_t}{dt} \qquad (3)$$

$$h_t = f(p_t, p_{t+dt}) = \mathrm{atan2}(\cos(t_{lat,t+dt})\sin(|p_{lon,t+dt} - p_{lon,t}|), \qquad (4)$$

$$\cos(p_{lat,t})\sin(p_{lat,t+dt}) - \sin(p_{lat,t})\cos(p_{lat,t+dt})\cos(|p_{lon,t+dt} - p_{lon,t}|))$$

$$\omega_t = f(h_t, h_{t+dt}) = \frac{h_{t+dt} - h_t}{dt} \qquad (5)$$

five correlation groups can be established including position, speed, acceleration, heading, and yaw rate. These groups are pre-established and stored as groups data 112 in the groups datastore 108.

In various embodiments, the parameters datastore 110 stores parameters data 114 for use by the anomaly detection module 104 and the source identification module 106. The parameters data 114 includes threshold data associated with each of the groups.

In various embodiments, the anomaly detection system 100 is configured to operate in two modes, such as, but not limited to, an offline mode and an online mode. For example, during design time and before manufacturing, the anomaly detection system 100 is operated in a training mode where parameters are determined and stored in the parameters datastore 110 for use by the anomaly detection module 104, and the source identification module 106. In another example, during operation of the vehicle 10, the anomaly detection system 100 is operated in an online mode where signal data is continuously processed based on the stored parameters from the parameters datastore 110.

In various embodiments, the training module 102 operates in the offline mode and receives anomaly data 116, signal data 118, and the groups data 112. The signal data 118 can include non-anomalous data. Based on the received data, the training module 102 trains the parameters that are used in the online mode and stores the parameters as parameters data 114 in the parameters datastore 110. In various embodiments, the parameters include a threshold for each of the sensor groups. The training module 102 determines the threshold by computing a minimal mean absolute error (MAE) from the signal data 118 yielding the threshold $\theta_{mean}$ for each respective correlation group. For example, the signal data 118 may include multiple trips which are indicated by Vehicle ID and Trip ID. For each trip, the five correlation groups are applied, and an estimated signal is computed. The estimated signal is subtracted from the received signal to obtain a threshold or the trip. If signal data 118 has N trips, then then N thresholds can be computed. The mean of all these N thresholds yields resulting $\theta_{mean}$.

Thereafter, the training module 102 computes a Fallout/False Positive Rate (FPR) for each correlation group. The false positive rate is computed as the ratio between the number of negative events wrongly categorized as positive and the total number of actual negative events. For example, when no (or very few) anomaly is injected on a specific sensor, no anomalies are detected and the computed FPR is small. The training module stores the computed FPRs and the thresholds as the parameters data 114 in the parameters datastore 110.

In various embodiments, the anomaly detection module 104 operates in the online mode and receives signal data 120, the groups data 112, and the parameters data 114. The signal data 120 is generated as a result of vehicle operation and may be communicated in messages within the vehicle 10 or in messages sent from other vehicles. Thus, the anomalies can be detected for sensors within the vehicle or for sensors of other vehicles, in various embodiments.

The anomaly detection module 104 evaluates the signal data 120 based on the groups identified by the groups data 112 to determine if an anomaly in one of the signals exists. For example, in various embodiments, the MAE is computed for all five correlation groups and compared to the threshold $\theta$ indicated by the parameters data 114. When the computed MAE is larger than the threshold $\theta$, the sensor group is marked as anomalous. When the computed MAE is less than the threshold $\theta$, the sensor group is marked as non-anomalous. After W samples, the samples are smoothed by a rolling mean filter of window size W and then the MAE is recalculated and compared again to the threshold to update the labels (anomalous or non-anomalous). To mitigate measurement error and improve performance, a batch size B is used for the evaluations. For example, when only 0.1*B predictions in the last B samples are anomalous, all predictions are marked as non-anomalous.

In various embodiments, the source identification module 106 receives the anomaly detection data 122, the parameters data 114, and the groups data 112. When the anomaly detection data 122 indicates an anomaly is found, the source identification module 106 processes the received data to determine a source of the of the detected anomaly. For example, the source identification module 106 computes for each sensor group, a mean of the predicted condition vector $\overline{PC}$. When the $\overline{PC}$ is smaller than the trained threshold (FPR) indicated by the parameters data 114, then the sensor is not anomalous.

Example: $FPR_{mean}=0.11$, $PC_p=[0,0,1,0,0,0,0,0,0,0]$, $\overline{PC}_p=0.1 \rightarrow p$ fine, continue.

When the $\overline{PC}$ is larger than the trained threshold, then the sensor is anomalous and the source detection data 124 is updated to indicate an anomaly is detected at the sensor relating to the sensor group.

In various embodiments, the source identification module 106 processes each sensor group by natural order of iteration through the correlation groups. For example, the source identification module 106 processes each sensor group using a depth first search (DFS) traversal of a three.

(1) Position→(2) Speed→(3) Acceleration→(4) Heading→(5) Yaw Rate.

The traversal will end when an anomaly source is determined. Thus, only one anomaly source can be detected. When the entire tree is traversed because the computed FPR is always lower than the threshold, an anomaly is not detected on any sensor and the source detection data 124 is updated to indicate no anomaly detected.

Figure 4:
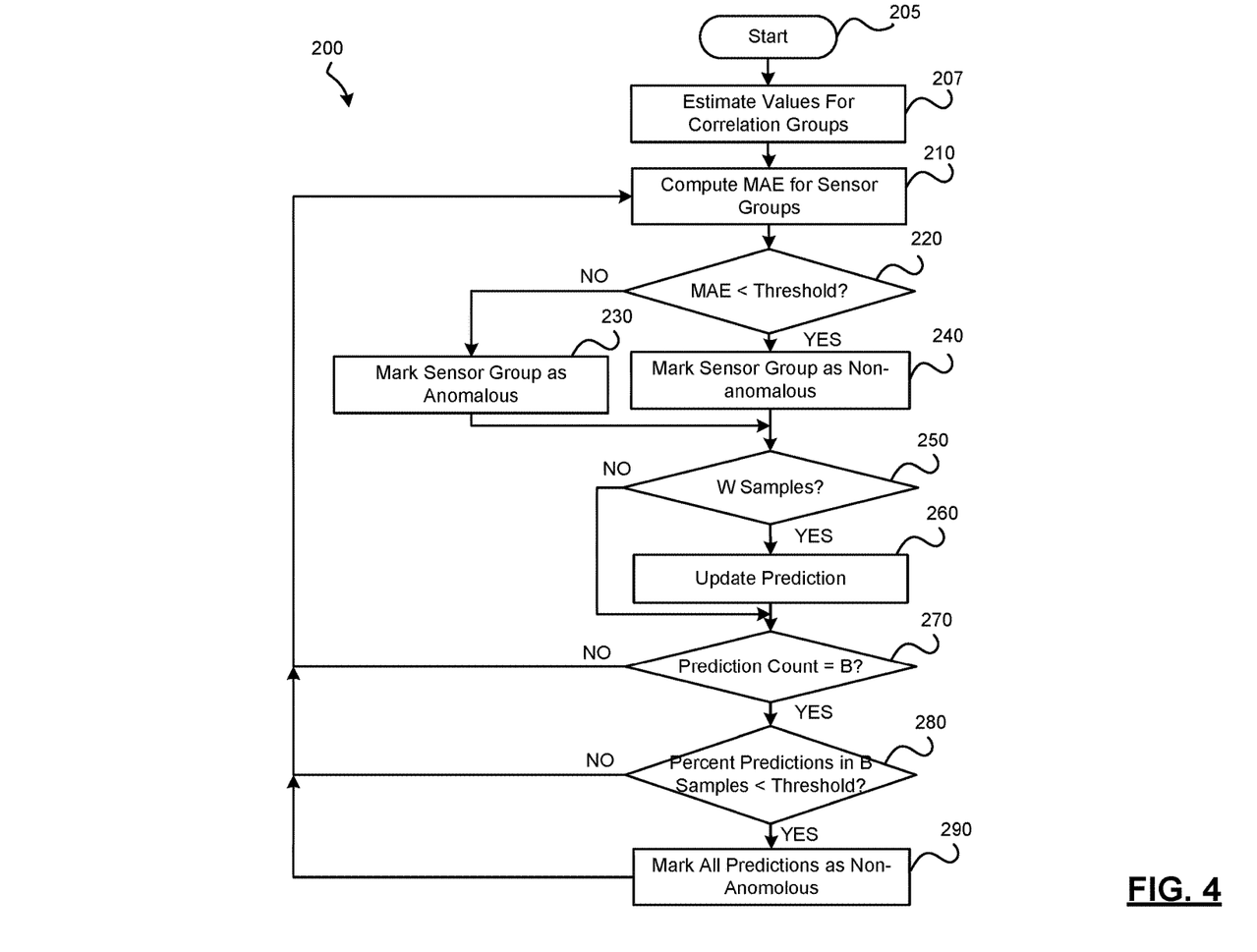
FIGS. 4 and 5 are flowcharts illustrating anomaly detection methods that may be performed by the anomaly detection system, in accordance with various embodiments.
Figure 5:
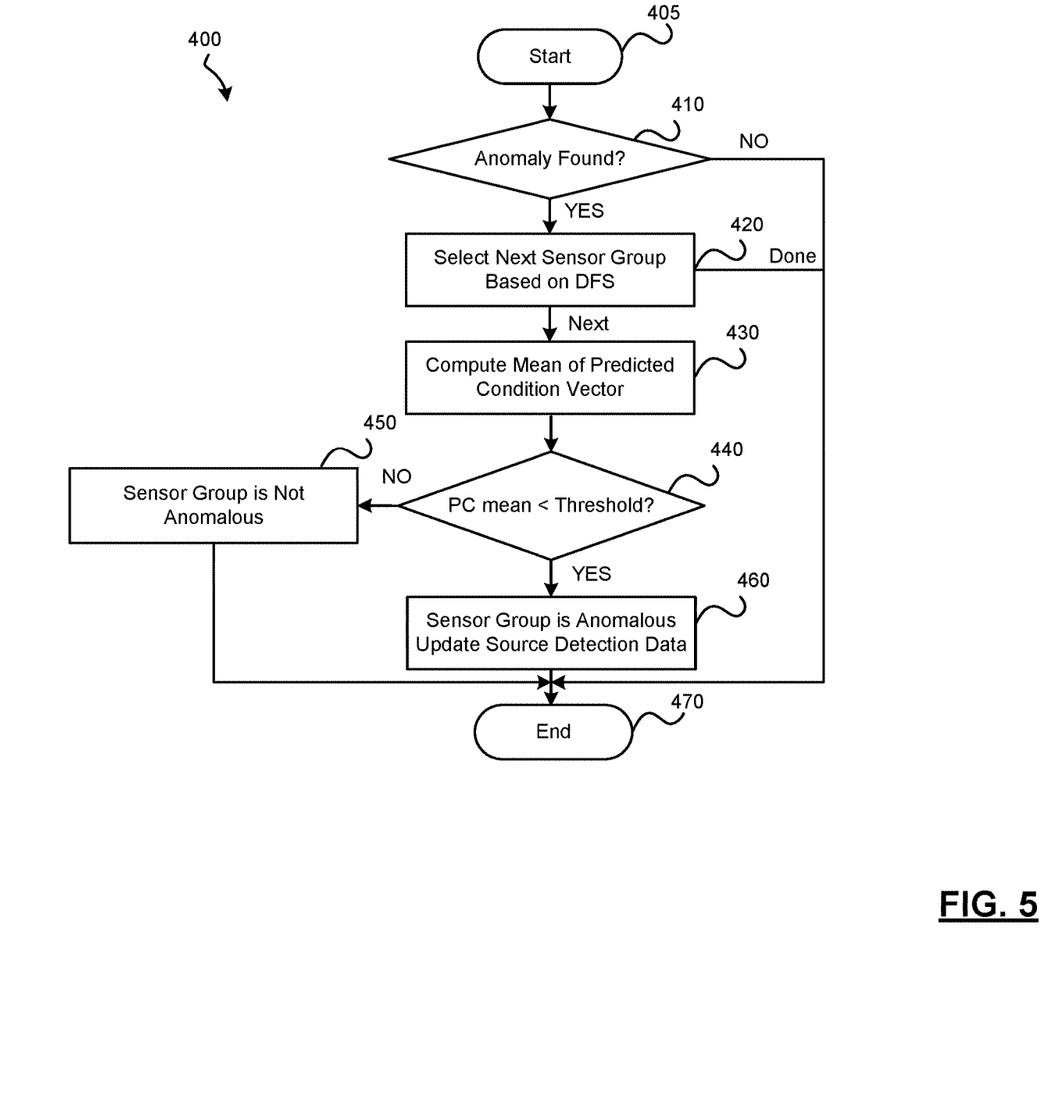

Referring now FIGS. 5 and 6, and with continued reference to FIGS. 1-4, a flowchart illustrates methods 200, 400 that can be performed by the anomaly detection system 100 of FIGS. 1-3 in accordance with the present disclosure. As can be appreciated in light of the disclosure, the order of operation within the methods is not limited to the sequential execution as illustrated in FIGS. 5 and 6 but may be performed in one or more varying orders as applicable and in accordance with the present disclosure. In various embodiments, the methods 200, 400 can be scheduled to run based on one or more predetermined events, and/or can run continuously during operation of the vehicle 10 or the remote transportation system 52.

In various embodiments, the method 200 may be performed to detect an anomaly. In one example, the method 200 begin at 205. The values are estimated based on the signal data 120 and, for example, equations above for each of the correlation groups at 207. The MAE is computed from all five correlation groups at 210. The MAE is then compared to the threshold $\theta$ indicated by the parameters data 114 at 220. When the computed MAE is larger than the threshold $\theta$ at 220, the sensor group is marked as anomalous at 230 and the anomaly detection data 122 is updated. When the computed MAE is less than the threshold $\theta$ at 220, the sensor group is marked as non-anomalous at 240.

After W samples have been evaluated at 250, a prediction is updated with a smoothed estimated signal at 260. Thereafter, the prediction count is evaluated at 270. If the prediction count is greater than the defined batch size B at 270, the batch is evaluated at 280. For example, when only a defined percentage of the predictions in the last B samples are anomalous at 280, all predictions in the batch are marked as non-anomalous at 290. Thereafter, the method continues with monitoring the next samples at 210.

In various embodiments, the method 400 may be performed to detect a source of the anomaly once an anomaly has been detected. In one example, the method 400 begin at 405. It is determined that an anomaly was detected at 410. A sensor group is selected at 420 for example using the DFS method as discussed above at 420. A mean of the predicted condition vector $\overline{PC}$ is computed for the sensor group at 430 and evaluated at 440. When the $\overline{PC}$ is larger than the threshold at 440, the sensor IS anomalous and the source detection data 124 is updated to indicate an anomaly at 460. Thereafter, the method may end at 470.

When the $\overline{PC}$ is smaller than the threshold (FPR) at 440, the sensor IS NOT anomalous at 450. The method continues with selecting the next sensor group at 420. If all sensor groups have been processed at 420 and no anomalies have been found, the method may end at 470.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for detecting an anomaly of a sensor of a vehicle, comprising:
storing information of a plurality of sensor correlation groups based on vehicle dynamics, wherein each of the plurality of sensor correlation groups includes at least two sensors that are correlated based on the vehicle dynamics;
sensing, by the at least two sensors of all of the plurality of sensor correlation groups, a subset of signals;
processing the subset of signals by computing a mean absolute error (MAE) based on the plurality of sensor correlation groups to determine when an anomaly exists;
processing the subset of signals to determine which sensor of the plurality of sensor correlation groups is anomalous; and
generating notification data to a vehicle system, the notification data indicating the sensor that is anomalous.

2. The method of claim 1, wherein the plurality of sensor correlation groups includes a position group, a speed group, an acceleration group, a heading group, and a yaw rate group.

3. The method of claim 2, wherein the subset of signals includes a position signal, a speed signal, an acceleration signal, a heading signal, and a yaw rate signal.

4. The method of claim 1, wherein the processing the subset of signals to determine when the anomaly exists is based on a defined batch size.

5. The method of claim 1, wherein the processing the subset of signals to determine which sensor of the plurality of sensor correlation groups is anomalous is based on a computed mean of a predicted condition vector associated with a sensor correlation group of the plurality of correlation groups.

6. The method of claim 1, further comprising training a plurality of thresholds based on anomalous signal data, and wherein the processing the subset of signals to determine which sensor of the plurality of sensor correlation groups is anomalous is based on the plurality of trained thresholds.

7. The method of claim 1, further comprising training a plurality of thresholds based on anomalous signal data, and wherein the processing the subset of signals to determine when a sensor of the plurality of sensor correlation groups is anomalous is based on the plurality of trained thresholds.

8. A computer implemented system, the system comprising:
a plurality of sensors configured to generate a subset of signals: and
an anomaly detection module that comprises one or more processors configured by programming instructions encoded in non-transitory computer readable media, the anomaly detection module configured to:
store information of a plurality of sensor correlation groups based on vehicle dynamics, wherein each sensor correlation group of the plurality of sensor correlation groups includes at least two sensors of the plurality of sensors that are correlated based on the vehicle dynamics;
process the subset of signals by computing a mean absolute error (MAE) based on the plurality of correlation sensor groups to determine when an anomaly exists;
process the subset of signals to determine which sensor of the sensor correlation groups is anomalous; and
generate notification data to a vehicle system, the notification data indicating the sensor that is anomalous.

9. The computer implemented system of claim 8, wherein the plurality of sensor correlation groups includes a position group, a speed group, an acceleration group, a heading group, and a yaw rate group.

10. The computer implemented system of claim 8, wherein the subset of signals includes a position signal, a speed signal, an acceleration signal, a heading signal, and a yaw rate signal.

11. The computer implemented system of claim 8, wherein the anomaly detection module is configured to process the subset of signals to determine when the anomaly exists based on a defined batch size.

12. The computer implemented system of claim 8, wherein the anomaly detection module is configured to process the subset of signals to determine which sensor of the plurality of sensor correlation groups is anomalous based on a depth first search method and the plurality of sensor correlation groups.

13. The computer implemented system of claim 8, wherein the anomaly detection module is configured to process the subset of signals to determine which sensor of the plurality of sensor correlation groups is anomalous based on a computed mean of a predicted condition vector associated with a sensor correlation group of the plurality of correlation groups.

14. The computer implemented system of claim 8, wherein the anomaly detection module is configured to train a plurality of thresholds based on anomalous signal data, and process the subset of signals to determine which sensor of the plurality of sensor correlation groups is anomalous based on the plurality of trained thresholds.

15. The computer implemented system of claim 8, wherein the anomaly detection module is configured to train a plurality of thresholds based on anomalous signal data, and process the subset of signals to determine when a sensor of the plurality of sensor correlation groups is anomalous based on the plurality of trained thresholds.

16. A method for detecting an anomaly of a sensor of a vehicle, comprising:
storing information of a plurality of sensor correlation groups based on vehicle dynamics, wherein each of the plurality of sensor correlation groups includes at least two sensors that are correlated based on the vehicle dynamics;
sensing, by the at least two sensors of all of the plurality of sensor correlation groups, a subset of signals;
processing the subset of signals to determine when an anomaly exists based on the plurality of sensor correlation groups;
determining which sensor of the plurality of sensor correlation groups is anomalous based on a depth first search method and the plurality of sensor correlation groups; and
generating notification data to a vehicle system, the notification data indicating the sensor that is anomalous.

* * * * *